DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1324

T883,027

SOIL APPLICATION OF IRON SULFATE WITH FLUID POLYPHOSPHATE FERTILIZERS

John J. Mortvedt and Paul M. Giordano, Florence, Ala., assignors to Tennessee Valley Authority, a corporation of the United States

Filed May 18, 1970, Ser. No. 38,528
**Int. Cl. A01g *1/00***
U.S. Cl. 71—1
No Drawing. 6 Pages Specification

Ferrous sulfate or ferric sulfate can be readily mixed with polyphosphate solution or suspension fertilizers. The maximum amount that will dissolve in solution fertilizers is about 1 percent iron. This amount can be increased to about 3 percent iron in suspension fertilizers. If the fertilizer is first diluted with water, the maximum level can be increased to as much as 5 percent iron before the mixture gels, but this decreases the fertilizers grade markedly. When applied to iron-deficient soils these relatively cheap iron sulfates in fluid polyphosphate fertilizers are available for crops. However, these salts usually are not available when applied alone to soils. Results of field trials have suggested that about 4 to 8 pounds of iron per acre supplied in the above fertilizer may be required for optimum production of grain sorghum. Band application of this material near the row crop is recommended to minimize reactions with the soil. Studies have shown that ferrous sulfate may be the preferred iron source because it does not readily form crystalline reaction products in the mixture upon standing. Fluid fertilizer with reasonably high polyphosphate contents are recommended when applying iron sulfate.